April 9, 1963 R. PARMENTER 3,084,651
SILENCER FOR SHIPS
Filed May 23, 1950 2 Sheets-Sheet 1

INVENTOR
RICHARD PARMENTER
BY
George Sipkin
ATTORNEYS

April 9, 1963 R. PARMENTER 3,084,651
SILENCER FOR SHIPS

Filed May 23, 1950 2 Sheets-Sheet 2

INVENTOR
RICHARD PARMENTER
BY
ATTORNEYS

United States Patent Office 3,084,651
Patented Apr. 9, 1963

3,084,651
SILENCER FOR SHIPS
Richard Parmenter, 602 Parkway, Ithaca, N.Y.
Filed May 23, 1950, Ser. No. 163,763
6 Claims. (Cl. 114—.5)
(Granted under Title 35, U.S. Code (1952), sec. 266)

The device herein described may be manufactured and used by or for the Government of the United States of America for governmental purposes without the payment of any royalties thereon or therefor.

The present invention relates to a method of reducing the sound energy transmitted from a vessel to the surrounding water, and more particularly to a method of reducing sound radiation by means of aerated water surrounding the hull of the vessel.

In radiant energy problems, it is a well-known and accepted principle that any change in the characteristics of the transmission medium will cause a reflection of at least a portion of the energy being transmitted, and that the amount of energy which is reflected will depend upon the degree to which the transmission medium is changed. It will be readily apparent that the energy transferred to the new medium will be considerably less than that emanating from the source. An example of such reflected energy is found in the creation of standing waves in high frequency transmission lines and wave guides which reduce the efficiency of the systems in which they exist.

In the present invention, this principle is applied to the reduction of the radiation of noise from a ship by interposing between the hull and the water a layer of small bubbles of gas which reflect a large percentage of sound transmitted through the hull back into it. In order for a layer of aerated water adjacent the hull to be effective in reflecting the vessel noises back into the hull, the density of the layer must be appreciably different from that of the hull and the water, and the layer must remain intact over the portions of the hull to be shielded. Sound energy passing through a bubble shield is diffused by the irregular surface of the layer and is therefore rapidly absorbed by the surrounding water.

Previous attempts to provide a discontinuity layer of gas bubbles adjacent the hull of the ship have operated on the principle of forcing air into the water by pumping air into perforated pipes or other conduits fastened to the outside of the hull. These devices have proved unsuccessful because the bubbles thus formed are relatively large in diameter and quickly coalesce to form a few large gaseous masses which immediately rise to the surface and do not form an effective layer around the hull.

The present invention provides an effective layer of aerated water adjacent the hull by mixing air and water into a pseudo-emulsion containing a tremendous number of fine bubbles and then forcing the pseudo-emulsion thus formed from a conduit perforated below the water line of the vessel by a large number of very small holes and attached to the exterior of the hull. The small bubbles thus formed have a very high surface tension and do not coalesce with each other, and because of their low buoyancy, they rise to the surface very slowly so that the layer thus formed remains in contact with the surface of the vessel during its travel through them. Since additional mixture is being forced from the conduit as the vessel moves, a continuous shielding is thus afforded the vessel.

It is an object of the present invention to provide an effective method of reducing the transmission of noise from a vessel to the surrounding water.

It is a further object of the present invention to provide a method of silencing a vessel by providing a layer of aerated water adjacent the hull.

It is a still further object of the present invention to provide a method of silencing a vessel by placing an aerated liquid adjacent the hull.

It is a yet further object of the present invention to provide a method of producing sound screening for a vessel by forcing an aerated liquid from a perforated conduit secured to the hull.

Further objects and advantages of the present invention will be made apparent by reference to the following description and to the appended drawings in which—

Figure 1:
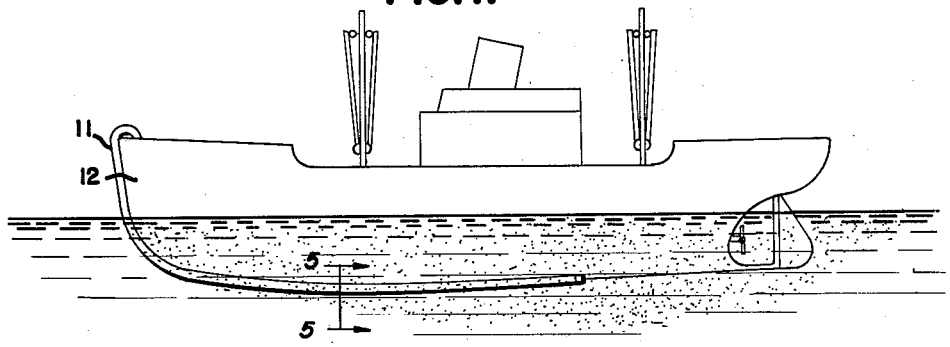
FIG. 1 shows one form of the present invention applied to a vessel.
Figure 2:
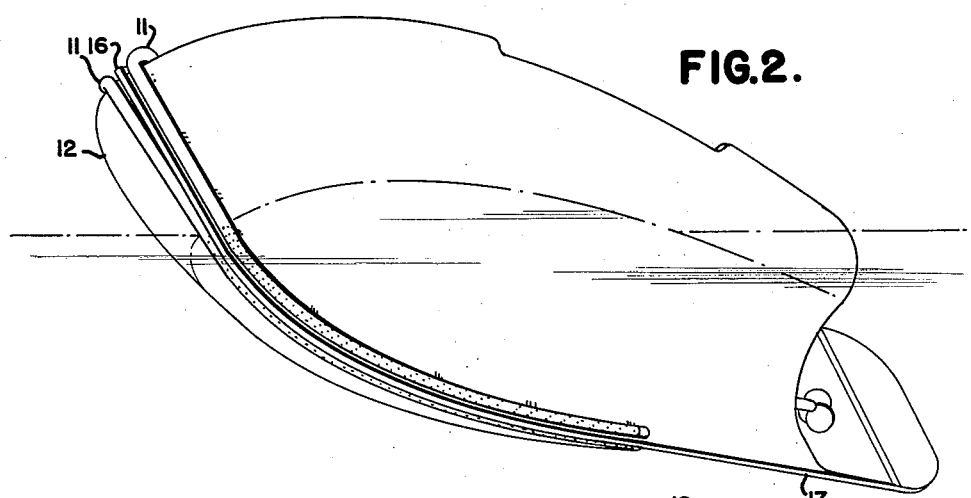
FIG. 2 is a perspective view of the vessel shown in FIG. 1 showing the attachment of the perforated conduits.

Referring now to FIG. 1, the conduits 11 are attached to the hull 12 on either side of the stem 16 and keel 17 by any suitable means such as welding, and extend approximately two-thirds the length of the hull and at least past the engine room. The conduits 11 are closed at the ends and are perforated below the water line by a series of small holes spaced along its length. The perforations 18 in the conduit 11 may, for example, be $\frac{1}{32}''$ in diameter and spaced 50 holes to a linear foot.

The conduits 11 extend along the stem and over the bow to the deck 19. Individualized pumps 22 are employed to pump sea water to the conduits 11, and interposed in each conduit 11 is a mixing nozzle 23 through which sea water is forced by the pumps 22 and combined with a gas to form an emulsified liquid containing a large number of very small bubbles.

As the term is used herein, a mixing nozzle is a device for combining a gas and a liquid to form an emulsion of the gas in the liquid. One example of such a mixing nozzle is a venturi throat having a gaseous inlet connected to the constricted throat, so that the passage of liquid through the throat creates a suction on the gaseous inlet to draw in the required gas which is mixed with the turbulence in and beyond the throat. Other examples are found in the carbonation equipment used in the manufacture of soft drinks. All such mixing nozzles have a liquid inlet for the liquid to be mixed with the gas, a gaseous inlet for the gas to be mixed with the liquid, and a liquid outlet for the emulsified liquid. The exact type of suction nozzle employed is unimportant so long as the emulsified liquid contains a large quantity of air in relatively small bubbles.

A venturi throat is described on the present application because it is simple to construct, rugged enough to withstand hard usage on board a ship, and creates a sufficient suction so as to require no pressurized gaseous source. Obviously other mixing nozzles may be employed if desired without departing from the spirit of the invention, and compressed gas may be employed if desired.

It has been found necessary to employ separate pumps for the conduits to insure a uniform distribution of the mixture over the two sides of the hull. As illustrated, the driving power for the pumps is supplied by a single electric motor 25, although the driving means may be of any desired type such as an internal combustion engine, and separate power plants may be employed for each pump if desired for a particular installation.

The pumps 22 should be capable of delivering large quantities of water at moderate pressures. For example, on a vessel of about 150 tons, pumps capable of delivering 200 gallons of water per minute at about 75 pounds per square inch are required in order to provide an effective sound screening.

Because of the abundance of water and air always present around a ship at sea, the liquid employed herein is the water supporting the ship and the gas which is mixed with the water is air. The suction inlet of the pump 22 is connected with the sea through piping passing through the hull of the vessel and the pressure outlet of the pump is connected to the liquid inlet of the mixing nozzle 23, the liquid outlet of the mixing nozzle being connected to the perforated conduit 11.

After passing through the suction nozzle 23, the aerated water is forced at a considerable pressure through the conduits 11 and the perforations 18. In passing through the perforations, the air bubbles are further divided to create bubbles having a diameter of a few thousandths of an inch and therefore possessing a high surface tension which prevents coalescion of the bubbles. Because of the extremely small size of the bubbles, their buoyancy is low so that they do not rise to the surface quickly and are therefore formed into an effective blanket around the hull by the movement of the ship through the water. The blanket of bubbles remains substantially intact in the area surrounding the propeller and therefore greatly reduces the noise of the propeller.

Figure 6:
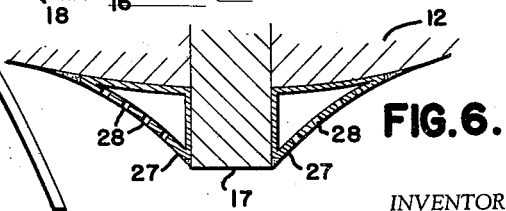
FIG. 6 is a sectional view of a modified conduit.
Figure 4:
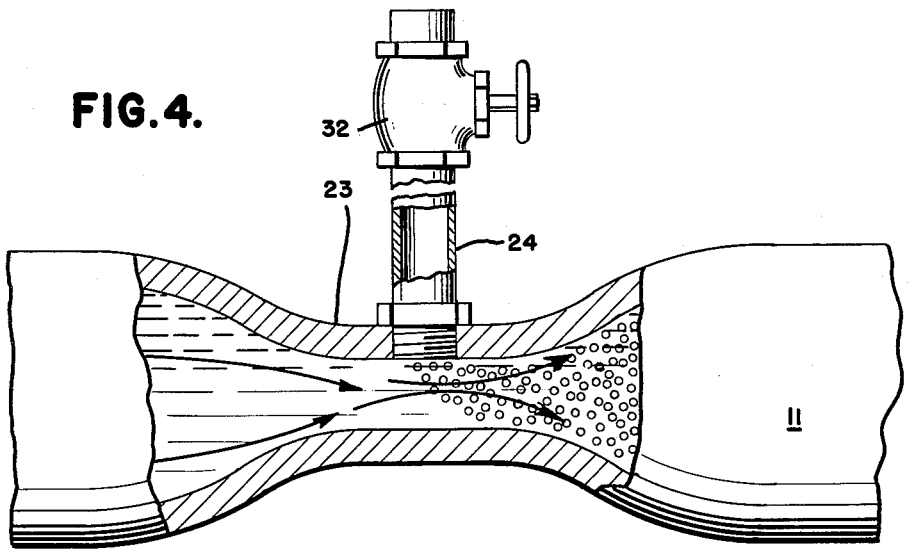
FIG. 4 shows the Venturi tube used to mix air and water in the conduits.

FIG. 6 shows a form of conduit designed to conform to the shape of the vessel and therefore to reduce the fluid resistance of the conduit to the water passing around it. The conduit 27 is shaped to fill the space between the hull and the keel and so act as a fillet to improve the streamlining of the hull. The perforation 28 are provided in the surface in contact with the water through which the ship is passing.

In order to control the operation of the present silencing system, valves 32 may be added to the air inlets 24 to control the admission of air to the venturi throat 20. When these valves are closed, the silencing is eliminated. There is little pressure applied to the valve at any time so that any desired type of valve may be employed.

Figure 7:
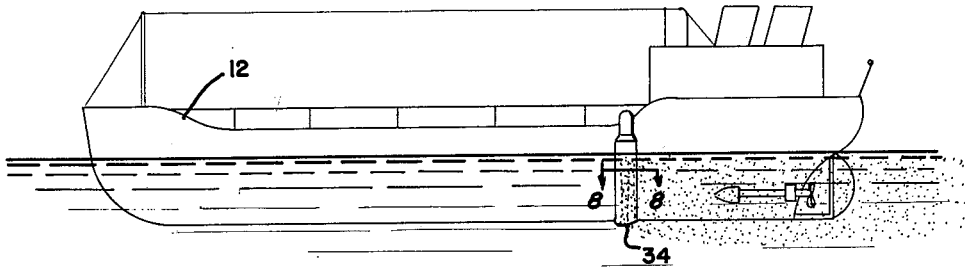
FIG. 7 shows a modified form of the present invention applied to a different type of vessel.
Figure 8:
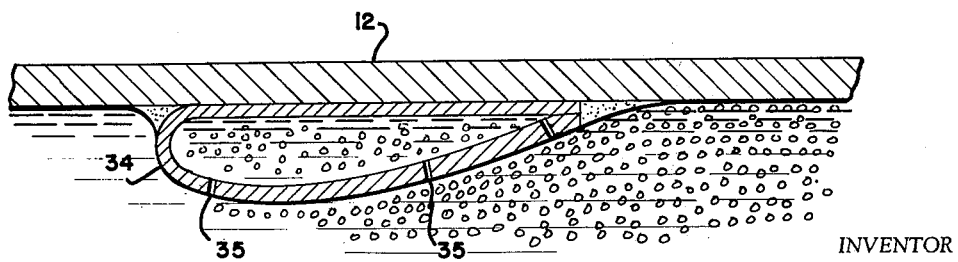
FIG. 8 shows a section through the conduit shown in FIG. 7.

FIG. 7 shows a modification of the present invention suitable for use on ships having no machinery in the bow section, such as tankers and ore ships. The conduits 34 extend to the keel of the ship in a transverse plane forward of the engine room, and is attached to the hull by a suitable means. In order to reduce the drag of the conduit through the water, the conduit 34 may be streamlined as shown in FIG. 8. The perforations 35 are located in the outside wall of the conduit.

Figure 3:
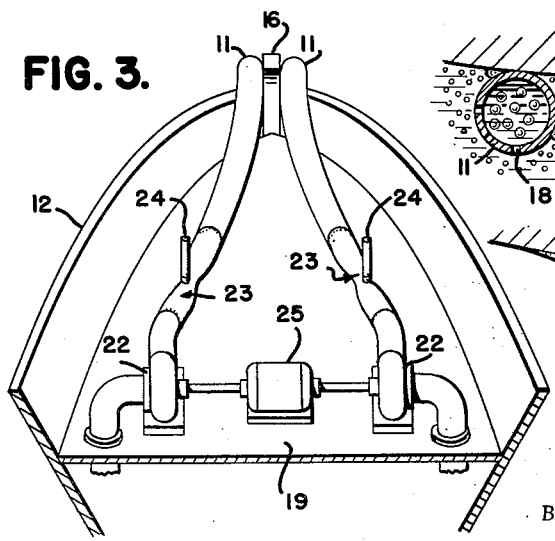
FIG. 3 is a view of the conduit arrangement on the vessel.
Figure 5:
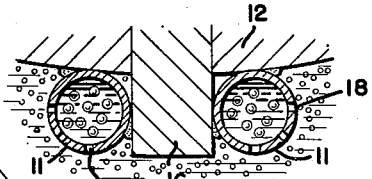
FIG. 5 is a sectional view of the conduits taken on line 5—5 in FIG. 1.

The conduits 34 are supplied with aerated water by apparatus similar to that shown in FIG. 3. The water is mixed with air by means of venturi throats and is then forced through the conduits to form a layer of bubbles around the hull of the ship.

It will be apparent to those skilled in the art that changes may be readily made in the invention herein described. The type of pump and the driving power for the pumps may be of any desired type, and the design of the venturi throat may also be varied. It is, however, important that air be mixed with the water before it is forced through the conduit in order to produce very small air bubbles which do not coalesce and which do not rise to the surface quickly.

I claim:

1. In a silencing system for vessels having machinery at the stern, a pair of perforated conduits extending from the water line to the keel on the exterior of said vessel in a plane transverse to the vessel and forward of the machinery to be silenced, a pair of mixing nozzles each having a gaseous inlet, a liquid inlet and a liquid outlet, means connecting a respective one of said liquid outlets to one of said perforated conduits, a pair of individualized pumps each having a suction inlet and a pressure outlet connected to a respective one of said liquid inlets of said mixing nozzles, means venting said gaseous inlets to atmosphere, and means connecting said suction inlets of said pumps to the water supporting said ship, whereby water moving through said suction nozzles is mixed with air and forced through said perforated conduits to form a bubble screen adjacent the stern of said vessel.

2. In a silencing system for vessels moving through water, a perforated conduit extending from the water line to the keel of the vessel forward of the portion of said vessel to be silenced, a mixing nozzle having a liquid inlet, a liquid outlet, and a gaseous inlet, a pump having a suction inlet and a pressure outlet, means connecting the suction inlet of said pump to a source of a liquid and said pressure outlet of said pump to the liquid inlet of said mixing nozzle, means connecting said liquid outlet of said mixing nozzle to said perforated conduit, and means connecting said gaseous inlet of said mixing nozzle to a source of a gas, whereby the gas is mixed with the liquid passing through the mixing nozzle to form an emulsion which is distributed over the exterior of the hull of said vessel by said perforated conduits and the movement of said vessel.

3. In a silencing system for use with a vessel passing through water, a perforated conduit extending from the water line to the keel of said vessel forward of the portion of said vessel to be silenced, a mixing nozzle having a liquid inlet, a gaseous inlet and a liquid outlet, a pump having a suction inlet and a pressure outlet, means connecting said suction inlet of said pump to the water supporting said vessel, means connecting said pressure outlet of said pump to the liquid inlet of said mixing nozzle, means connecting said liquid outlet of said mixing nozzle to said perforated conduit, and means connecting said gaseous inlet of said mixing chamber to the atmosphere, whereby water is aerated in said mixing nozzle and the emulsion is distributed over the hull of said vessel.

4. In a silencing system for use with a vessel passing through water, a perforated conduit extending from the water line to the keel of said vessel forward of the portion of said vessel to be silenced, a venturi throat having a liquid inlet, a liquid outlet, and a gaseous inlet connected to the throat thereof, a pump having a suction inlet and a pressure outlet, means connecting the suction inlet of said pump to the water supporting said vessel, means connecting the pressure outlet of said pump to the liquid inlet of said venturi throat, means connecting the liquid outlet of said venturi throat to said perforated conduit, and means connecting said gaseous inlet of said venturi throat to the atmosphere, whereby water is aerated and distributed over the hull of said vessel by said perforated conduit.

5. In a silencing system adapted to be attached to a vessel moving through water, a perforated conduit adapted to be secured to the exterior of said vessel and to extend from the water line to the keel thereof, a mixing nozzle having a liquid inlet, a liquid outlet, and a gaseous inlet, a pump having a pressure outlet connected to said liquid inlet of said mixing nozzle and a suction inlet adapted to be connected to the water supporting the vessel, means connecting said liquid outlet of said mixing nozzle to said perforated conduit, and means connecting said gaseous inlet to the atmosphere, whereby the water passing through the mixing nozzle is aerated and distributed by said perforated conduit.

6. In a silencing system for a vessel moving through water, a pair of perforated conduits extending from the water line to the keel on respective sides of said vessel, a pair of mixing nozzles each having a liquid inlet, a gaseous inlet, and a liquid outlet, means connecting said liquid outlets to respective ones of said perforated conduits, a pair of pumps each having a suction inlet and a pressure outlet, means connecting the pressure outlet of each of said pumps to a respective one of said liquid inlets of said mixing nozzles, means for connecting said suction inlets to the water supporting said vessel, and means for connecting said gaseous inlets of said mixing nozzles to the atmosphere, whereby aerated water is distributed over both sides of the hull of said vessel.

References Cited in the file of this patent

UNITED STATES PATENTS

| | | |
|---|---|---|
| 1,416,950 | Fay | May 23, 1922 |
| 1,697,257 | Anissimoff | Jan. 1, 1929 |
| 2,145,463 | Spinanger | Jan. 31, 1939 |
| 2,146,605 | Timpson | Feb. 7, 1939 |
| 2,300,642 | Booth | Nov. 3, 1942 |
| 2,420,795 | Phillips | May 20, 1947 |

FOREIGN PATENTS

| | | |
|---|---|---|
| 491,838 | Great Britain | Sept. 9, 1938 |